United States Patent [19]

Chen et al.

[11] Patent Number: 5,721,595
[45] Date of Patent: Feb. 24, 1998

[54] MOTION ESTIMATION BLOCK MATCHING PROCESS AND APPARATUS FOR VIDEO IMAGE PROCESSING

[75] Inventors: Hongyi Chen; Qingming Shu, both of Beijing, China

[73] Assignee: United Microelectronics Corporation, Taipei, Taiwan

[21] Appl. No.: 666,986

[22] Filed: Jun. 19, 1996

[51] Int. Cl.⁶ .................................................. H04N 7/32
[52] U.S. Cl. ........................................ 348/699; 382/236
[58] Field of Search .................................. 348/384, 390, 348/400–402, 407, 409–413, 415, 416, 420, 699; 382/232, 236, 238; H04N 7/137

[56] References Cited

U.S. PATENT DOCUMENTS

| | | | |
|---|---|---|---|
| 5,453,801 | 9/1995 | Kim | 348/699 |
| 5,488,419 | 1/1996 | Hui et al. | 348/402 |
| 5,502,492 | 3/1996 | Jung | 348/413 |
| 5,508,744 | 4/1996 | Savatier | 348/416 |
| 5,539,469 | 7/1996 | Jung | 348/699 |
| 5,568,569 | 10/1996 | Golin | 348/416 |

*Primary Examiner*—Richard Lee
*Attorney, Agent, or Firm*—Rabin, Champagne & Lynt, P.C.

[57] ABSTRACT

A process for obtaining a motion vector for motion estimation used in a video image analysis, utilizing a block matching algorithm, which has the effect of reducing the computational load that is placed on the hardware logic used for implementation of the process. In a process of obtaining the absolute error value for the compared image block, a preliminary comparison is performed for every processed pixel in the image block to determine if the set minimum value of the absolute error function represented by a motionless tolerance constant is achieved. It is not necessary to obtain every actual value of the absolute error function. The block matching scheme of providing motion estimation enables hardware implementing the process to discontinue processing if the desired motion vector is selected prior to all image blocks being compared.

13 Claims, 2 Drawing Sheets

MOTION ESTIMATION BLOCK MATCHING PROCESS AND APPARATUS FOR VIDEO IMAGE PROCESSING

BACKGROUND OF THE INVENTION

1. Field of the Invention

The invention relates in general to a motion estimation process and apparatus for video image processing. In particular, the invention relates to a block matching scheme using a motion estimation algorithm for video image processing.

2. Technical Background

In the application of video image processing technologies in areas such as high definition television (HDTV), video telephones and video conferencing, the use of video signal compression techniques is one of the key factors when system performance and efficiency are considered. A high compression ratio for a video signal can be translated directly into good performance and high signal processing efficiency of the system. In order to obtain a high compression ratio for video signals, so that digital video data can be processed in the system at lower bit rates, an efficient encoding scheme and efficient hardware must be used. Typically, an efficient encoding scheme implemented by an encoding system would combine several techniques including, for example, motion compensation, digital cosine transform, visual characteristics quantization, Huffman coding, etc.

Motion compensation for video signal processing is a technique by which the video image signals are manipulated in the time domain, based on the statistical characteristics of video signals. In principle, if consecutive video image flames at very short time intervals have their image blocks analyzed, it is frequently found that each of the analyzed image blocks will normally have a relatively small difference in its video characteristics. This characteristic of the video image, which is the primary difference when still image characteristics are compared, defines the underlying principle for many of the video image compression schemes. The motion compensation technique used thus has an important and significant influence on the compression ratio factor for video image compression and encoding systems.

Motion estimation is the basis of the motion compensation technique. Successful implementation of a motion compensation technique relies on the precision, speed and efficiency of the algorithm that implements the technique. Among the various processes developed for implementing the motion estimation technique, block matching is one that is relatively simple and clear to implement most easily in terms of substantial hardware, and as such has been widely utilized in this area.

Of the block matching processes used for implementing motion estimation in video image processing systems, there are at present several known algorithms suitable for use in such processes including, for example, the full search algorithm, the three step search algorithm, the cross search algorithm, the orthogonal search algorithm, etc. Although these algorithms were all developed to comply with the requirement that they provide fast computational results based on a reduced amount of number crunching operations, they are still considered to involve a relatively large number of computational operations. This is because they are all based on the principle of performing selection and comparisons after the mathematical function value, representing the absolute error between the original image block and the compared one, is obtained. To show that the computational effort involved in obtaining this mathematical function result is still vast, consider an example outlined below, with reference to the drawings.

A conventional block matching process typically involves a procedure in which one from a number of blocks of images is selected for comparison, its mathematical function value that represents its absolute error with respect to an original image block is computed, and then the function value is compared with that of the other image blocks. The very image block that is compared and determined to have the smallest discrepancy with respect to the original image block would be selected as the searched matching block, and the image shift between the searched image block and the original one as compared and represented by the functional value discrepancy, is taken as the motion vector therebetween.

FIG. 1 is a flow chart showing the procedural steps of a conventional block matching process. Before the processing is initiated, small portions of an original image comprising pixel data X are provided, whereas the original image block has an N×N array of pixels organized in N vertical columns and N horizontal rows, wherein N is an integer. Then, after a short time interval, another set of small portions of a compared image comprising pixel data Y are provided for comparison with their corresponding original counterparts. Again, the compared image block has an N×N array of pixels in N vertical columns and N horizontal rows.

Assume that the image shifting change of the compared image block with respect to the original one is represented by (k,l), wherein k and l are also integers. An absolute error between the compared and the original image block may thus be defined by the function $$F(k,l) = \sum_{i=1}^{N} \sum_{j=1}^{N} |X(i,j) - Y(i+k, j+l)| \tag{1}$$

wherein i and j are integer indices and $i \leq N$ and $j \leq N$.

The above absolute error function $F(k,l)$ represents a level of discrepancy in image characteristics, between the original image block and the compared one having an apparent shift (k,l) with respect to the original.

Another motionless tolerance constant mdt is defined to set a standard for determining whether or not a small image shift, found when comparing an image block to its original counterpart, can be regarded as a nil change (a nil change being one that can be disregarded without processing it in the hardware). For example, in a situation in one comparison, wherein the shift (k,l) is found to be (0,0) and its corresponding absolute error function $F(k,l)$ is determined to be smaller than mdt, the two consecutive image blocks can be regarded as being without a shift. A minimum absolute error err may thus be defined to represent the current minimum value for the absolute error function $F(k,l)$.

As shown in FIG. 1, at step 105, the minimum absolute error variable err is set to the initial value of mdt, and the block matching process commences at step 110 by setting the initial shift (k,l) at (0,0). This signifies the selection of a compared image block that has a position on the image frame that coincides with that on the original image block. Then the procedure determines the absolute error function for this selected block, as shown in step 115, wherein the value of the function F(0,0) is calculated in accordance with equation (1).

Next, the value of the absolute error function F(0,0) is compared with the minimum absolute error variable err in step 120. If it is found that the condition F(0,0)<err exists, the absolute error function value F(0,0), corresponding to the shift (0,0) in the compared image block with respect to the original one, would be smaller than the motionless tolerance constant mdt, a condition that has been agreed to be treated as no relative motion detected between the compared and the original image blocks. The procedure would then proceed to step 125 to set the motion vector MV to the value (0,0), and the block matching process may conclude at this point. Otherwise, if there is a condition F(0,0)>err, the procedure would branch to step 130, where it would be determined that the compared image block has developed a movement relative to the original image, and a search procedure for the block matching algorithm should therefore be performed. For this, the motion vector MV is first set to the initial value of (0,0), and the minimum absolute error variable err in set to the value of the absolute error function F(0,0). The procedure then proceeds to step 135, where another one of the compared image blocks would be searched and selected for the performance of computational procedures. Since the compared image block is the one shifted a distance represented by (k,l), it can be said that the search is conducted within a specified range with respect to the original image block.

Then, in step 140, equation (1) is utilized to determine the value of the absolute error function F(k,l) corresponding to the selected image block (k,l), before proceeding to step 145. At step 145, however, the current value of the function F(k,l) is compared with the minimum absolute error variable err. If it is found that F(k,l)>err, the value of the function F(k, l) can be neglected, and the procedure continues at step 155. If F(k,l)<err, the procedure proceeds to step 150.

At step 150, the current value of the absolute error function F(k,l,) replaces the current value of the minimum absolute error variable err since, as determined in step 145, the value of F(k,l) was smaller than the value of err at that time. Meanwhile, the shift of the current compared image block with respect to its corresponding original image block should be taken as the new motion vector MV. This is signified in the flow chart at step 150 by setting err=F(k,l) and MV=(k,l).

Then, the process proceeds to step 155, where a determination is made as whether or not all the image blocks in the image frame have undergone the comparison with their corresponding original image blocks. If they have, the process may be concluded; otherwise, the procedure returns to step 135 to perform block matching for a next compared image block.

Thus, this prior art block matching process requires complete determinations of each value of the absolute error function F(k,l), specifically at step 140, utilizing the complex equation (1) outlined above. However, each such determination involves a calculation loop program. Essentially, there are $N^2$ arithmetic operations followed by an absolute value operation to obtain each F(k,l) value. This is a considerable amount of computational load to the hardware implementing the process, which reduces the overall performance.

SUMMARY OF THE INVENTION

It is therefore an object of the invention to provide a block matching process for motion estimation for video image processing, that implements a procedure with reduced computational load on the hardware system.

The invention achieves the above-identified object by providing a process for implementing a block matching scheme for obtaining a motion vector as part of a motion estimation used for video image analysis. The process includes providing an original image block that has image pixel data X, including an N×N array of image pixels organized in N vertical columns of pixels (N rows and N columns), wherein N is a plural integer. A plurality of compared image blocks having shifts (k,l) is also provided. The shifts are designated with respect to the corresponding original image blocks thereof, wherein k and l are integers, and wherein each of the compared image blocks includes image pixel data Y, each of the compared image blocks including an N×N array of image pixels organized as N vertical columns of N pixels. A motionless tolerance constant mdt, a minimum absolute error variable err, and an absolute error function F(k,l), $$F(k,l) = \sum_{i=1}^{N} \sum_{j=1}^{N} |X(i,j) - Y(i+k, j+l)|$$

are defined where i and j are integer indices; wherein $i \leq N$ and $j \leq N$, and err is set equal to mdt.

One compared image block is selected from the plurality of compared image blocks, having a shift (k,l)=(0,0), and the functional value of F(0,0) is calculated. That is, in effect a correlation is performed on the original and compared image blocks. The value F(k,l) provides a measure of the relative success of the correlation. Then, the functional value F(0,0) is compared to the minimum absolute error variable err and MV is set equal to (0,0). The process is stopped if it is determined that F(0,0) is smaller than the threshold value err. However, the process continues to the next step if it is determined that the value of F(0,0) is larger than err. If the process continues, an intermediate absolute error function $F_T(k,l)$ is defined, the motion vector MV is set to equal (0,0), and err is set to equal F(0,0). Whether or not there is any compared image block in the plurality of compared image blocks still not yet selected for processing is then determined, and the current motion vector MV is set as the sought motion vector for the matched image block. If any compared image blocks have not been selected, then the process is stopped. If all have been selected, then the process continues to the next step. In the latter case, another one of the plurality of compared image blocks is selected for processing, and $F_T(k,l)=0$, i=1 and j=1 are set. Then, $F_T(k,l)$ ← $F_T(k,l)+|X(i, j)-Y(i+k, j+l)|$ is set. Next, the current intermediate absolute error function $F_T(k,l)$ is compared to the minimum absolute error variable err, and the process returns to the step of determining whether any compared image blocks have not been selected, if $F_T(k,l)$>err. Otherwise the process continues with the next step. Then, a determination is made as to whether or not the current values (i, j) represent the last pixel in the processed image block, and (i,j) is increased to represent the next pixel in the processed image block. The process then returns to the step of setting $F_T(k,l)$ ← $F_T(k,l)+|X(i, j)-Y(i+k, j+l)|$ if the current (i,j) does not represent the last pixel, or continues with the next step if the current (i,j) does represent the last pixel. If the process continues, then the next step is to set err=$F_T(k,l)$ and MV=(k,l). Then, the process returns to the step of determining whether any compared image blocks have not been selected.

BRIEF DESCRIPTION OF THE DRAWINGS

Other objects, features, and advantages of the invention will become apparent by way of the following detailed description of the preferred but non-limiting embodiments. The description is made with reference to the accompanying drawings in which.

DETAILED DESCRIPTION OF THE PREFERRED EMBODIMENT

Figure 1:
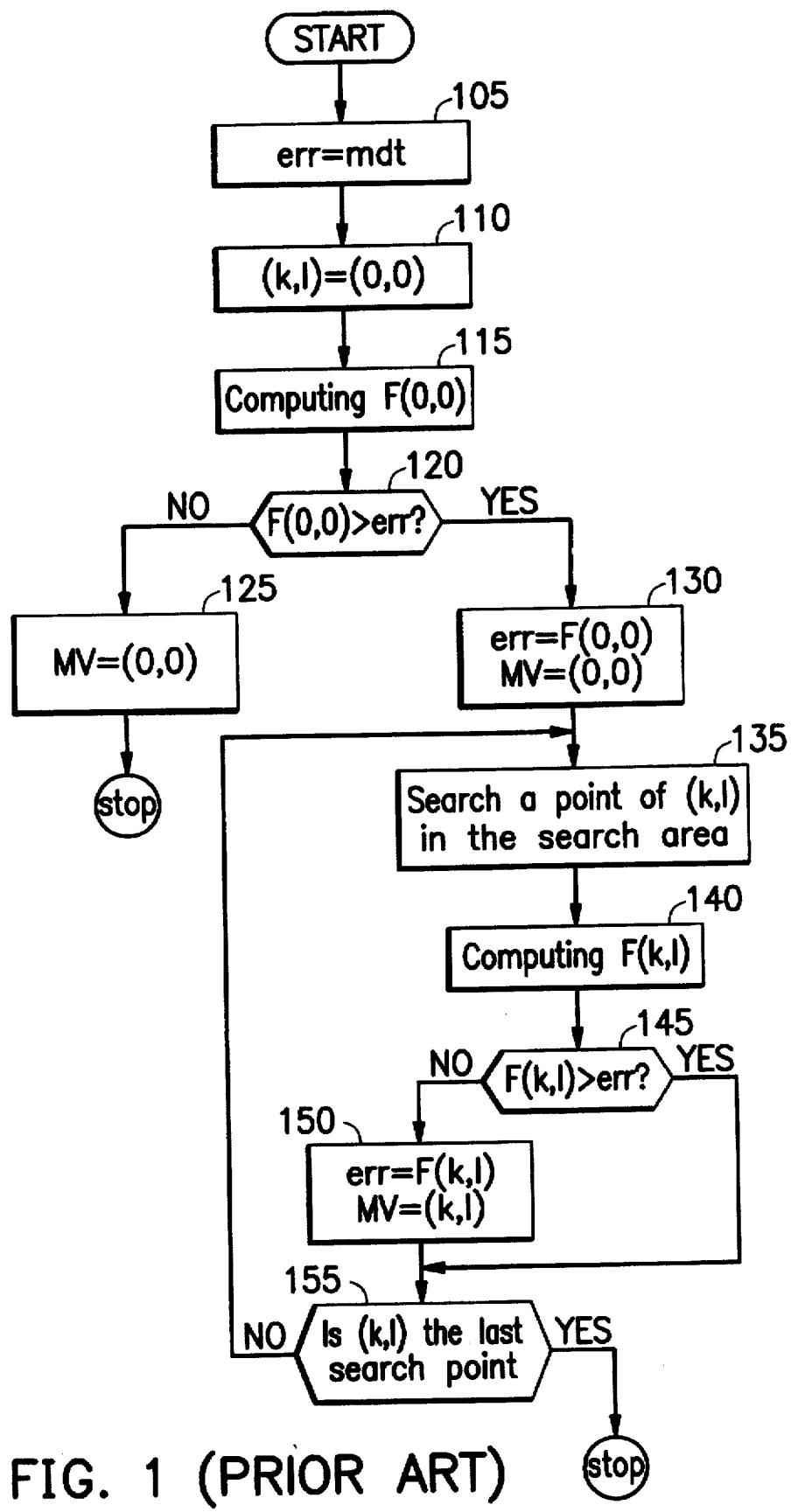
FIG. 1 is a flow chart showing the steps of a conventional block matching algorithm.

A preferred embodiment of the block matching scheme for the motion estimation algorithm of the invention is described in the following paragraphs. By block matching for a video image processing algorithm, all of the image pixels of an entire image frame of a video program are divided into small local blocks. For the purpose of the discussion of the invention, assume the entire image frame is divided into a number of image blocks, each including an N×N array of $N^2$ pixels arranged in N vertical columns and horizontal rows. Assuming a maximum possible shift of w pixels for a compared image block with respect to its original counterpart, then an area around the compared image block confined in the range of N+2w should be set up as the search area for seeking the match. A search is conducted within this area after a short time interval, seeking to find a number of image blocks N×N in size for comparison with the original image block, with their respective distances from the compared original image block represented by (k,l).

An absolute error function F(k,l), which is a function of the distance (k,l) of the compared image block with respect to the corresponding original block, represents the degree of matching between the compared and the original image blocks. A search is made for the minimum value of the function F(k,l) in the pairs of compared and original image blocks of the analyzed video image frame, and the compared image block that provides the minimum value is taken as the matched image block, whose shift with respect to its corresponding original image block is then taken as the motion vector MV for the image frame analyzed. A key to the high performance and high efficiency of the block matching scheme of the present inventive algorithm lies in the fact that it is the identity of block having the minimum of all the values of the absolute error function F(k,l) sought, not the actual mathematical value of the function, that is required to be determined. Comparison operations may already be carried out in the process of calculating the actual value of the absolute error function F(k,l), and once the minimum value of the function is obtained, the computational scheme can be terminated immediately to reduce the total arithmetic operation load placed on the hardware, thereby improving both performance and efficiency.

For details of the algorithm of the invention, reference is made to FIG. 2 of the drawings, wherein a flow chart shows the steps of the block matching process in accordance with a preferred embodiment of the invention, as described below. Before the process is initiated, based on the same terminology as that used for the above description of the prior art process, small portions of an original image, comprising pixel data X, are provided in a block, whereas the original image block is an N×N array of pixels organized in N vertical columns and N horizontal rows, wherein N is an integer. Then, after a short time interval, another set of small portions of a compared image comprising pixel data Y are provided for comparison with their corresponding original counterparts. Again, the compared image block is an N×N array of $N^2$ pixels arrayed in N vertical columns and N horizontal rows.

Assuming the image shift of the compared image block with respect to the original one is represented by (k,l), wherein k and l are also integers, then an absolute error between the compared and the original image block may be defined by the function expressed by the following equation (1):

$$F(k,l) = \sum_{i=1}^{N} \sum_{j=1}^{N} |X(i,j) - Y(i+k, j+l)| \qquad (1)$$

wherein i and j are integer indices and $i \leq N$ and $j \leq N$.

The above absolute error function F(k,l) again represents a level of discrepancy between the image characteristics of the original image block and that of a compared image block having an apparent shift (k,l) with respect to the original.

The motionless tolerance constant mdt is again used to set a standard for determining whether or not a small shift in the image, found when comparing an image block to its original counterpart, can be regarded as a nil change, so that it can be neglected without processing in the hardware. In other words, in a situation wherein the shift (k,l) in one comparison is found to be (0,0) and its corresponding absolute error function F(k,l) is determined to be smaller than mdt, then the two consecutive image blocks can be regarded as being without a shift. A minimum absolute error err may thus be defined to represent the current minimum value for the absolute error function F(k,l).

Figure 2:
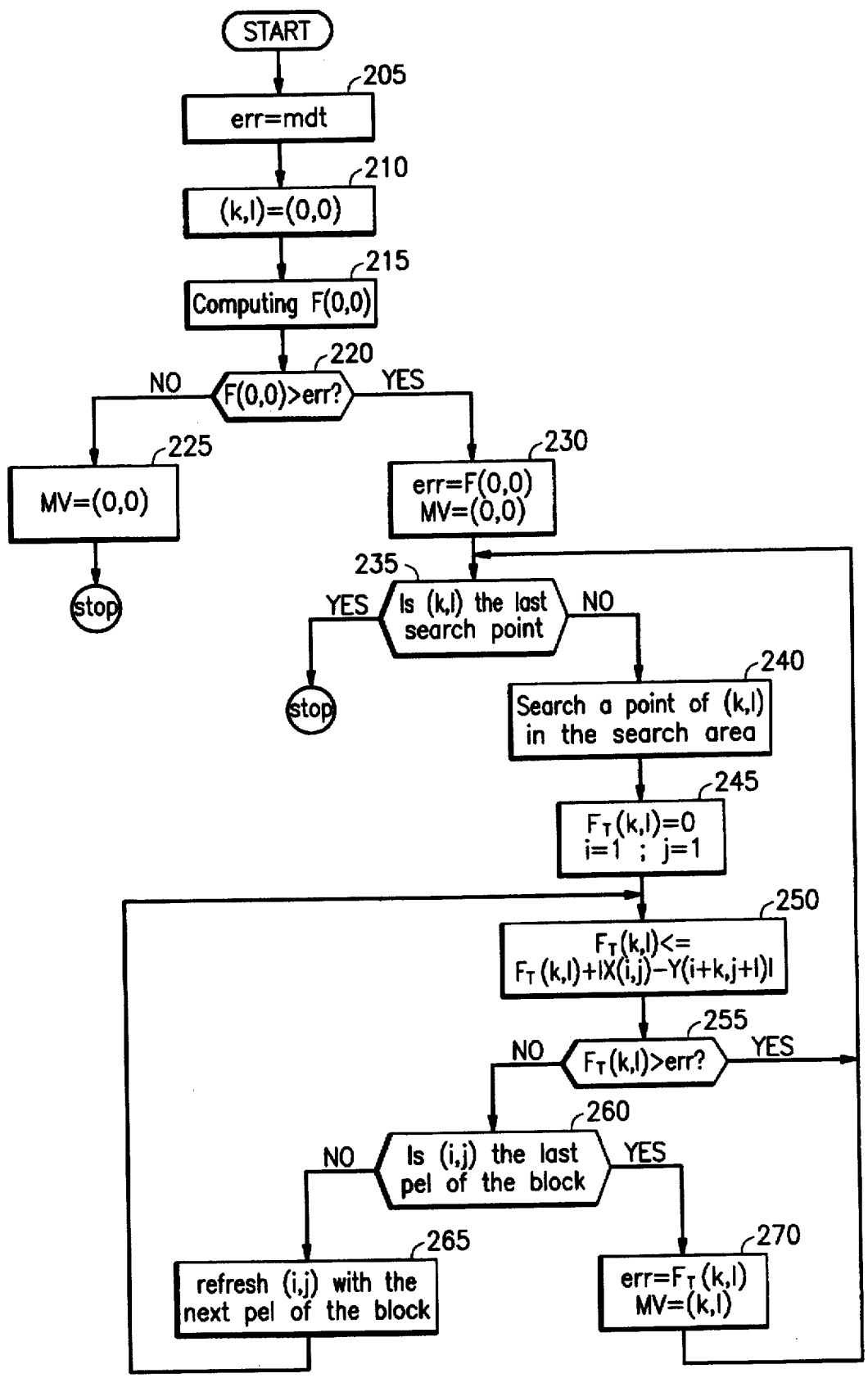
FIG. 2 is another flow chart, showing the steps of a block matching algorithm in accordance with a preferred embodiment of the invention.

In FIG. 2 at step 205, as in FIG. 1., the minimum absolute error variable err is set to the initial value of mdt. The procedure for the block matching algorithm then commences at step 210 by setting the initial shift (k,l) to the value of (0,0). This signifies the selection of a compared image block whose position on the image frame coincides with that of the original image block. Then in step 215, the absolute error function for this selected block, F(0,0) is calculated in accordance with equation (1).

Next, in step 220, the calculated value of the absolute error function F(0,0) is compared with the minimum absolute error variable err. If it is found that F(0,0)<err, the value F(0,0) of the absolute error function, corresponding to the shift (0,0) in the compared image block with respect to the original one, would be smaller than the motionless tolerance constant mdt, which, as noted above, is a condition to be treated as though no relative motion has been detected between the compared and the original image blocks. In that case, step 225 proceeds to set the motion vector MV to the value (0,0), and the block matching algorithm would conclude at this point. However, if from the comparison it is determined that F(0,0)>err, then it is determined that the compared image block has developed a movement relative to the original image, and the procedure branches to step 230, where a search procedure is performed. For this, the motion vector MV is first set to an initial value of (0,0), and the minimum absolute error variable err in set to the value of the absolute error function F(0,0).

An intermediate absolute error function $F_T(k,l)$ is defined to represent the intermediate value along the computational procedure for obtaining the value of the function F(k,l). The value of the intermediate absolute error function $F_T(k,l)$ may be used in preliminary comparisons as described below, to see if the sought minimum value for the function has been reached. If so, then the computational procedure for calculating the final function value in the program loop implemented by the hardware may be terminated in advance to reduce the total computational load placed on the hardware, thereby improving overall performance and efficiency.

The procedure continues to step 235, wherein a determination is made as to whether or not all the image blocks in the image frame have undergone the comparison with their corresponding original image blocks. If so, the algorithm may be concluded, and the current motion vector MV is taken as the sought value; otherwise, the procedure continues at step 240.

At step 240, the search area is searched and another one of the compared image blocks is selected for computational procedures. Since the compared image block is the one shifted by a distance represented by (k,l), it can be said that the search is performed within a specified range with respect to the original image block. Then, at the next step, step 245, the intermediate absolute error function $F_T(k,l)$ is set to the value 0, with indices i and j for equation (1) both set to a starting value of 1.

After the initial values are set at step 245, the algorithm continues to step 250, wherein a calculation of the mathematical value of the absolute error function $F(k,l)$ is initiated, utilizing the concept of the intermediate absolute error function $F_T(k,l)$ described above. The computational procedure involves the rotation of a repeated program loop, wherein one pixel is incorporated into the equation for each single loop of the calculation. Specifically, the intermediate function is expressed as follows $$F_T(k,l) \leftarrow F_T(k,l) + |X(i, j) - Y(i+k, j+l)|$$

Then, in the following step 255, the current value of the intermediate function $F_T(k,l)$ is compared with the current minimum absolute error variable err. If it is found that $F_T(k,l) \geq$ err, the value of the function $F_T(k,l)$ can be abandoned or ignored, and the procedure returns to step 235. If $F_T(k,l) >$ err, the procedure returns to step 235, where a check is made as to whether processing of the last of the compared image blocks has been completed. Otherwise, the algorithm proceeds to step 260 for further processing.

At step 260, a check is made as to whether the last of the pixels in the analyzed image block (i=N, j=N) has already been incorporated into the expression for the determination of the value of the intermediate absolute error function $F_T(k,l)$. If the last pixel has been incorporated, the procedure then continues at step 270. If the last pixel has not been incorporated yet, the procedure continues at step 265, at which the indices value (i,j) are updated, and then the looped procedural steps of step 250 are performed. To determine if the last of the pixels in an analyzed image block have been incorporated, the indices i and j are each compared with the horizontal and vertical dimensional size, N, of each small image block that constitutes the basic unit for analysis of block matching. If both indices have reached N, then the last of the pixels has been incorporated. Otherwise, the indices are properly increased in value to continue the program loop in step 250. As an example, in step 260, a determination is made as to see whether or not i=N and j=N, and, if so, continuing with the next step in 270. Otherwise, it can be continued by comparing j and N if i≠N or j≠N, and setting j←j+1 if it is determined that j<N, otherwise increasing i by 1 and setting j=1 and branching to step 265.

At step 270, wherein the last of the pixels in the searched image block has been processed, and the current value of the intermediate absolute error function $F_T(k,l)$ is smaller than the current value $(F_T(k,l))$ of the minimum absolute error err of the compared image block. Its value may now replace the err as the newly set minimum absolute error value, and the corresponding shift (k,l) between the compared and the original image blocks is taken as the searched motion vector MV for the analyzed image block. After setting err=$F_T(k,l)$ and MV=(k,l), the procedure then returns to step 235 to determine whether or not all the image blocks in the image frame have undergone the comparison with their corresponding original image blocks. Thus, by processing through all the image blocks in an image frame analyzed, the minimum value of the absolute error function $F(k,l)$ may be obtained, without having to complete all the computational procedural steps to actually obtain the substantial value of the function in every case, and this reduces the computational work load for the hardware utilized in the implementation of the inventive algorithm.

In the above-described preferred embodiment of the invention, the value of the absolute error function F(0,0) corresponding to the compared image block without substantial shift is first compared with the motionless tolerance constant mdt, which, as mentioned above, is a key quantity used to substantially reduce the overall computational load for the algorithm hardware. As persons skilled in the art can well appreciate, the procedure can still be directed to step 230 in FIG. 2 and continue to obtain the motion vector for the analyzed image block.

Thus, the inventive process for the block matching scheme in motion estimation analysis for video image frames as described above, is distinguished in that it is not necessary to obtain every actual value of the absolute error function. As is well known in the art, it takes a tedious program loop to conclude the computational procedure used to actually obtain the function value. The process of the invention for the block matching scheme for motion estimation provides an exit to partially escape this program loop and results in a reduced computational load being placed on the hardware logic used to implement the process. By exiting the program loop once it is determined that the minimum value is determined in the process of computation, vast amount of computational operations can be spared. Under normal conditions, a 50% reduction in the computational load, calculated based on the general statistical concept for a sample space, such as that containing the large pixel number involved in a processing procedure for video image frames, can be achieved.

The process of the invention may be performed by a programmed computer, or other specially-designed data processor such as a video image processor, having a hardware interface for obtaining video image data. Within this data processor, the process may be implemented in hardware, or in some combination of hardware and software, such as through the use of a microprocessor. Alternatively, the process may be implemented by a logic circuit which performs the steps of the process as dictated by a computer program. This computer program may reside in memory in the processor and may include executable instructions which cause the processor to perform the process of the invention. Once the process of the invention has been performed, the resulting motion vector data can be used to compress the video signal, or to otherwise continue the video image processing. Persons of ordinary skill in the art will appreciate that many hardware and hardware/software implementations may be used to perform the process of the invention, both implementations that are used to perform conventional process and those that are not currently used. Such systems are contemplated and intended to fall within the scope of the invention.

While the invention has been described by way of example and in terms of a preferred embodiment, it is to be understood that the invention is not limited to the disclosed embodiment. It is intended to cover various modifications and similar arrangements, and the scope of the appended claims should be accorded the broadest interpretation so as to encompass all such modifications and similar structures.

What is claimed is:

1. A process for obtaining a motion vector in a motion estimation for video image analysis using a block matching algorithm, comprising:

(1) providing an original image block including a plurality of image pixel data X, the original image block including an N×N array of image pixels organized in N vertical columns and N horizontal rows, wherein N is a plural integer, (2) providing a plurality of compared image blocks shifted by amounts represented by (k,l) with respect to the original image block, wherein k and l are integers, and wherein each of the compared image blocks includes image pixel data Y, each of the compared image blocks including an N×N array of image pixels organized in N vertical columns and N horizontal rows;

(3) defining an absolute error function F(k,l) by the equation $$F(k,l) = \sum_{i=1}^{N} \sum_{j=1}^{N} |X(i,j) - Y(i+k, j+l)|$$

wherein i and j are integer indices, i≦N and j≦N, and defining a motionless tolerance constant mdt and a minimum absolute error variable err, and setting err=mdt;

(4) selecting one compared image block for processing from the plurality of compared image blocks, the selected compared image block being shifted relative to the corresponding original image block by the amount (k,l)=(0,0), and calculating the value of F(0,0);

(5) comparing the value of F(0,0) to the minimum absolute error variable err and if the value of F(0,0) is smaller than the variable err, setting MV=(0,0), and stopping the process;

(6) if the value of F(0,0) is larger than the variable err in (5) defining an intermediate absolute error function $F_T(k,l)$, setting a current motion vector MV=(0,0) and setting a current minimum absolute error variable err= F(0,0);

(7) setting the current motion vector MV as the sought motion vector for the matched image block and then stopping the process if all compared image blocks among the plurality of compared image blocks have been selected for processing;

(8) selecting another one of the plurality of compared image blocks for processing, setting $F_T(k,l)$=0, i=1 and j=1 if any compared image block among the plurality of compared image blocks has not yet been selected for processing;

(9) increasing $F_T(k,l)$ by |X(i, j)−y(i+k, j+l)|;

(10) after (9), comparing the current value of intermediate absolute error function $F_T(k,l)$ to the current minimum absolute error variable err, and returning to (7) if $F_T(k,l)$>the current minimum absolute error variable err;

(11) following (10), if $F_T(k,l)$ is not greater than err, then determining whether the current value of (i, j) represents the last pixel in the processed image block, and if not, increasing the value of (i, j) to represent the next pixel in the processed image block and returning to (9);

(12) following (11), if the current value of (i, j) represents the last pixel in the processed image block, setting err=$F_T(k,l)$ and setting MV=(k, l); and

(13) following (12), returning to (7).

2. The process of claim 1, wherein (11) further comprises determining whether or not i=N and j=N, and if so, performing (12), otherwise continuing to compare j and N if i≠N or j≠N, and increasing j by 1 if j<N, and otherwise increasing i by 1 and setting j=1 and returning to (9).

3. The process of claim 1, wherein (1) includes capturing a video image signal, processing the video image signal to obtain image data in a data field, and dividing the data field into a number of image blocks.

4. The process of claim 1, further comprising

(14) providing the current motion vector MV to a compression stage of a video image processor, for use in a compression process.

5. A process for obtaining a motion vector in a motion estimation for video image analysis using a block matching algorithm, comprising:

(1) providing an original image block, including image pixel data X, the original image block including an N×N array of image pixels organized in N vertical columns and N horizontal rows, wherein N is a plural integer;

(2) providing a plurality of compared image blocks shifted by amounts represented by (k,l) with respect to corresponding original image blocks thereof, wherein k and l are integers, and wherein each of the compared image blocks includes image pixel data Y, each of the compared image blocks including an N×N array of image pixels organized in N vertical columns and N horizontal rows;

(3) defining an absolute error function F(k,l) by the equation $$F(k,l) = \sum_{i=1}^{N} \sum_{j=1}^{N} |X(i,j) - Y(i+k, j+l)|$$

wherein i and j are integer indices, i≦N and j≦N, and defining a minimum absolute error variable err;

(4) selecting one compared image block from the plurality of compared image blocks, the selected compared image block being shifted relative to the corresponding original image block by an amount (k,l)=(0,0), and calculating the functional value of F(0,0); (5) setting a motion vector MV=(0,0) and setting a current minimum absolute error variable err=F(0.0); (6) defining an intermediate absolute error function $F_T(k,l)$; (7) setting the current motion vector MV as the sought motion vector for the matched image block and then stopping the process if all compared image blocks among the plurality of compared image blocks have been selected for processing; (8) selecting another one of the plurality of compared image blocks for processing and setting $F_T(k,l)$=0, i=1 and j=1 if any compared image block among the plurality of compared image blocks has not yet been selected for processing;

(9) increasing $F_T(k,l)$ by |X(i, j)−Y(i+k, j+l)|;

10) after (9), comparing the current value of the intermediate absolute error function $F_T(k,l)$ to the current minimum absolute error variable err, and returning to (7) if $F_T(k,l)$>the current minimum absolute error variable err;

(11) following (10), if $F_T(k,l)$ is not greater than the current minimum absolute error variable err, then determining whether or not the current value of (i, j) represents the last pixel in the processed image block, and if not, increasing the value of (i, j) to represent the next pixel in the processed image block and returning to (9);

(12) following (11), if the current value of (i, j) represents the last pixel in the processed image block, setting err=$F_T(k,l)$ and setting MV=(k, l); and

(13) following (12), returning to (7).

6. The process of claim 5, wherein said step (11) further comprising determining whether or not i=N and j=N, and if so, performing (12), otherwise continuing to compare j and N if i≠N or j≠N, and increasing j by 1 if j<N, and otherwise increasing i by 1 and setting j=1 and returning (9).

7. The process of claim 5, wherein (1) includes capturing a video image signal, processing the video image signal to obtain image data in a data field, and dividing the data field into a number of image blocks.

8. The process of claim 5, further comprising
(14) providing the current motion vector MV to a compression stage of a video image processor, for use in a compression process.

9. A process for obtaining a motion vector in a motion estimation for video image analysis using a block matching algorithm, comprising:
(1) obtaining an original image block including pixel data at different pixel locations;
(2) obtaining a plurality of compared image blocks, wherein each compared image block is located in a relative position shifted by designated numbers of pixel positions with respect to the original image block;
(3) selecting one of the plurality of compared image blocks to correlate with the original image block;
(4) calculating an absolute error value for the correlation;
(5) setting a motion vector value corresponding to the relative position;
(6) comparing the absolute error value to an original threshold value;
(7) ending the process if the absolute error value is less than the threshold value and setting a new threshold value equal to the absolute error value if the absolute error value is greater than the original threshold value;
(8) ending the process if each of the plurality of compared image blocks has been selected and setting an intermediate absolute error value to zero if any of the plurality of compared image blocks has not been selected;
(9) calculating an intermediate error value based on a correlation of corresponding individual pixels of the original image block and the compared image block and increasing the intermediate absolute error value by the intermediate error value;
(10) comparing the increased intermediate absolute error value to the new threshold value and returning to (8) if the increased intermediate absolute error value is greater than the new threshold value;
(11) if the increased intermediate absolute error value is not greater than the new threshold value, returning to (9) if all the corresponding individual pixels in the original image block and the compared image block have not been correlated, and if all the corresponding individual pixels in the original image block and the compared image block have been correlated, setting a current motion vector value corresponding to a position of the compared image block relative to the original image block, and setting the new threshold value equal to the increased intermediate absolute error value; and

(12) returning to (8).

10. The process of claim 9, wherein (11) further comprises determining whether or not i=N and j=N, and if so, performing (12), otherwise continuing to compare j and N if i≠N or j≠N, and increasing j by 1 if j<N, and otherwise increasing i by 1 and setting j=1 and returning to (9).

11. The process of claim 9, wherein (1) includes capturing a video image signal, processing the video image signal to obtain image data in a data field, and dividing the data field into a number of image blocks.

12. The process of claim 9, further comprising
(13) providing the motion vector to a compression stage of a video image processor, for use in a compression process.

13. An apparatus for obtaining a motion vector in a motion estimation for video image analysis using a block matching algorithm, comprising:
(1) means for obtaining an original image block including pixel data at different pixel locations;
(2) means for obtaining a plurality of compared image blocks, wherein each compared image block is located in a relative position shifted by designated numbers of pixel positions with respect to the original image block;
(3) means for selecting one of the plurality of compared image blocks to correlate with the original image block;
(4) means for calculating an absolute error value for the correlation;
(5) means for setting a motion vector value corresponding to the relative position;
(6) means for comparing the absolute error value to an original threshold value;
(7) means for ending the process if the absolute error value is less than the threshold value and setting a new threshold value equal to the absolute error value if the absolute error value is greater than the original threshold value;
(8) means for ending the process if each of the plurality of compared image blocks has been selected and setting an intermediate absolute error value to zero if any of the plurality of compared image blocks has not been selected;
(9) means for calculating an intermediate error value based on a correlation of corresponding individual pixels of the original image block and the compared image block and increasing the intermediate absolute error value by the intermediate error value;
(10) means for comparing the increased intermediate absolute error value to the new threshold value; and
(11) means for setting a current motion vector value corresponding to the relative position, and the new threshold value equal to the increased intermediate absolute error value if all the corresponding individual pixels in the original image block and the compared image block have been correlated.

* * * * *